United States Patent [19]

Greanias et al.

[11] Patent Number: 4,764,885

[45] Date of Patent: Aug. 16, 1988

[54] MINIMUM PARALLAX STYLUS DETECTION SUBSYSTEM FOR A DISPLAY DEVICE

[75] Inventors: Evon C. Greanias, Chevy Chase; Karl F. Schroeder, Gaithersburg; Louis V. Ruffino, Potomac, all of Md.

[73] Assignee: International Business Machines Corporaton, Armonk, N.Y.

[21] Appl. No.: 856,627

[22] Filed: Apr. 25, 1986

[51] Int. Cl.⁴ ............................................. G08C 21/00
[52] U.S. Cl. .................................... 364/571; 178/18; 178/19; 340/708
[58] Field of Search ................... 178/18, 19; 364/571, 364/709, 710; 340/709, 708; 250/216, 568

[56] References Cited

U.S. PATENT DOCUMENTS

| | | | |
|---|---|---|---|
| 3,505,561 | 2/1967 | Ward et al. | 340/707 |
| 3,509,350 | 4/1970 | Gundrum | 250/549 |
| 3,832,693 | 8/1974 | Ishizaki et al. | 340/708 |
| 3,958,234 | 5/1976 | Hoo | 178/18 |
| 4,017,680 | 4/1977 | Anderson et al. | 340/707 |
| 4,227,044 | 10/1980 | Fencl | 178/19 |
| 4,302,011 | 11/1981 | Pepper, Jr. | 178/19 |
| 4,340,777 | 7/1982 | DeCosta et al. | 178/18 |

Primary Examiner—Parshotam S. Lall
Assistant Examiner—Ellis B. Ramirez
Attorney, Agent, or Firm—John E. Hoel

[57] ABSTRACT

A minimum parallax stylus detection subsystem is disclosed for use with a graphic input grid overlay which is positioned on the viewing surface of a display device. The invention has a three phase operation wherein, during the first phase, the stylus is at a remote distance from the viewing surface of the display and therefore no representation of the stylus position is displayed. During a second phase, the stylus is brought within a first threshold distance from the viewing surface of the display, during which a cursor image is generated which is precisely positioned on the display corresponding to the detected position of the stylus. During a third phase of operation of the invention, the stylus is brought within a close proximity of the viewing surface of the display, during which the cursor image is removed from the display and an actual trace of the path of the stylus with respect to the graphic input grid overlay is shown. In this manner, the operator can focus attention on the displayed location of the cursor instead of on the physical location of the stylus, thereby minimizing the parallax error in the location of the stylus with respect to the displayed image.

4 Claims, 4 Drawing Sheets

PARALLAX ERROR IN PLACEMENT OF STYLUS

FIG. 1.
PARALLAX ERROR IN PLACEMENT OF STYLUS

FIG. 3.
STYLUS DETECTION SUBSYSTEM

FIG. 4. PHASE 1

FIG. 5. PHASE 2

FIG. 6. PHASE 3

MINIMUM PARALLAX STYLUS DETECTION SUBSYSTEM FOR A DISPLAY DEVICE

BACKGROUND OF THE INVENTION

1. Technical Field

The invention disclosed broadly relates to improvements in digital computer architecture and more particularly relates to an improved stylus detection subsystem used in conjunction with a graphic input grid overlay which is positioned on the viewing surface of a display device.

2. Background Art

Modern microcomputer systems generally include a central processing unit (CPU) which is connected by means of an address bus and a data bus to a plurality of input/output (I/O) devices such as a keyboard, a display device, serial communications devices, printers, and other I/O equipment. It is well recognized that graphical representations are a powerful and efficient means for characterizing data, the graphical representations being displayed on a display device such as a raster scanned cathode ray tube display, a gas panel display, a light emitting diode array display, and the like. The power of graphics as a medium to improve the man-machine communication is usually limited, however, because of the uni-directional flow of the information, since typical data processing systems can present data in the form of graphical information to the user, however the user is limited in his ability to communicate with the system by inputting graphical information.

The prior art has attempted to provide graphical input devices in the form of graphic input tablets. Such tallets are opaque platforms containing a grid work of horizontal and vertical wires which sequentially carry a radiative signal which is picked up by a stylus brought into close proximity to the tablet. The coordinates for the relative position of the stylus with respect to the tablet are correlated with the sequential radiation from the respective wires in the tablet, thereby producing a digital value for the stylus position which can be input to the system. The problem with such opaque graphic input tablets is that it is difficult for the user to position the stylus on the tablet so that corresponding tablet position and stylus position images displayed on the display device can be adjusted as desired by the user.

The prior art has attempted to improve the correlation between the relative position of the stylus and the radiative wires and the corresponding displayed positions on the display device, by providing a transparent, graphic input grid overlay which is positioned on the viewing surface of the display device. In a manner similar to that used in prior art opaque graphic tablets, the graphic input grid overlay has an array of horizontal and vertical wires which are sequentially energized with a signal so that they sequentially radiate electromagnetic radiation. That electromagnetic radiation can be picked up by a stylus and thus coordinates are established for the relative position of the stylus with respect to the wire grid. The system can then display on the display device the corresponding relative position of the stylus and other images depicted on the display. The problem with this prior art approach is the parallax effect which the viewer suffers in attempting to locate the stylus at a point over the viewing surface of the display. The parallax occurs because the user is focusing on the physical location of the stylus, and is attempting to bring that physical location into close contact with a preexisting image displayed on the display device. Since the user generally does not have his eye exactly aligned with the stylus and further, since the graphic input grid overlay may not have its constituent wire grid precisely registered with respect to the position of that grid which is attributed by the display device, there is usually a parallax error in the positioning of the stylus.

OBJECTS OF OF THE INVENTION

It is therefore an object of the invention to provide an improved graphic input mechanism for a display device.

It is still another object of the invention to provide an improved stylus detection mechanism for a display device. It is still a further object of the invention to provide an improved stylus detection mechanism having a minimum parallax effect, when used with a display device.

SUMMARY OF THE INVENTION

These and other objects, features and advantages of the invention are accomplished by the minimum parallax stylus detection subsystem for a display device, disclosed herein. The invention finds application in a data processing system including a display subsystem having a display device with a transparent viewing plate of finite thickness. The visual manifestation of the image to be displayed is formed on the inside surface of the plate for viewing through the plate. The stylus detection subsystem disclosed herein, is used in cooperation with the display subsystem, to minimize the parallax between the apparent position of the stylus and the detected position of the stylus. A graphic input grid overlay is positioned over the viewing surface of the display device, and contains an array of signal wires which are disposed over the viewing plate, for radiating a signal from a radiative signal source, those signals to be received by the stylus. A decoder is connected to the signal wires in the overlay and to the radiative signal source, for selectively connecting selected ones of the signal wires to the signal source. A coordinate generator, such as a counter, has an output connected to the decoder, for cyclically outputting coordinate values representing positions on the grid overlay, those values being input to the decoder. The decoder sequentially energizes the signal wires with the radiative signal. A maximum signal detector has an input connected to the stylus, for generating a triggering signal when a maximum value is detected in the strength of the radiated signal received by the stylus from the sequentially energized wires in the overlay. A cursor image generator has an input connected to the counter, an input connected to the maximum signal detector and an output connected to the display subsystem, for generating cursor image signals for display on the inside of the viewing plate at a location corresponding to the coordinate values output from the counter when the radiated signal strength is a maximum. A low level signal detector has an input connected to the stylus, a first output connected to the decoder and a second output connected to the cursor image generator, for outputting a first enabling signal to the decoder when the stylus is farther than a first distance from the viewing plate. In response to this, the decoder cOnnects selected ones of the wires of the signal source to radiate in a quiescent state pattern. Typically, this pattern will include either all of the horizontal wires or all of the vertical wires or both horizontal and the vertical wires, in order to present the uniform radiative pattern over the surface of the graphic input grid overlay. The low level detector terminates the first enabling signal when the stylus is brought closer to the viewing plate than the first distance but still farther away from the viewing plate than a second distance. The low level detector will output a second enabling signal to the cursor image generator which, in response thereto, will output cursor image signals for display on the viewing plate at a location corresponding to the coordinate values output from the counter. A stylus trace generator has an input connected to the counter and to the maximum signal generator and an output connected to the display subsystem, for generating stylus trace signals for display on the inside of the viewing plate at a location corresponding to the coordinate values output from the counter when the radiated signal strength is at a maximum. A high level signal detector has an input connected to the stylus and an output connected to the stylus trace generator, for outputting an enabling signal to the stylus trace generator when the stylus is closer to the viewing plate than the second distance. The stylus trace generator in response to this, outputs the stylus trace signals for display on the viewing plate at a location corresponding to the coordinate values output from the counter. In this manner, the operator can focus his attention on the displayed location of the cursor instead of the physical position of the stylus, in order to identify the location of the stylus as it is perceived by the stylus detection subsystem, thereby minimizing the parallax error in such positioning.

BRIEF DESCRIPTION OF THE DRAWINGS

The foregoing and other advantages of the invention will be more fully understood with reference to the description of the best mode and the drawing wherein.

RELATED PATENTS

The following related patents illustrate additional background for the invention and provide further support for the disclosure herein. All of the following patents are assigned to the International Business Machines Corporation.

U.S. Pat. No. 4,087,625 entitled "Capacitive Two Dimensional Tablet with Single Conductive Layer."

U.S. Pat. No. 4,009,338 entitled "Tablet with Improved Pen Height Compensation."

U.S. Pat. No. 3,999,012 entitled "Graphic Entry Tablet with Improved Addressing."

U.S. Pat. No. 3,992,579 entitled "Tablet System with Digital Activation."

U.S. Pat. No. 3,921,165 entitled "High Resolution Graphic Data Tablet."

U.S. Pat. No. 3,668,313 entitled "Resistive Grid Graphic Data Tablet."

U.S. Pat. No. 3,662,377 entitled "Triple-Sample A/D Converter."

U.S. Pat. No. 3,593,115 entitled "Capacitive Voltage Driver."

U.S. Pat. No. 3,588,345 entitled "Position Transducer Using a Sweeping Field Null."

DESCRIPTION OF THE BEST MODE FOR CARRYING OUT THE INVENTION

Figure 1:
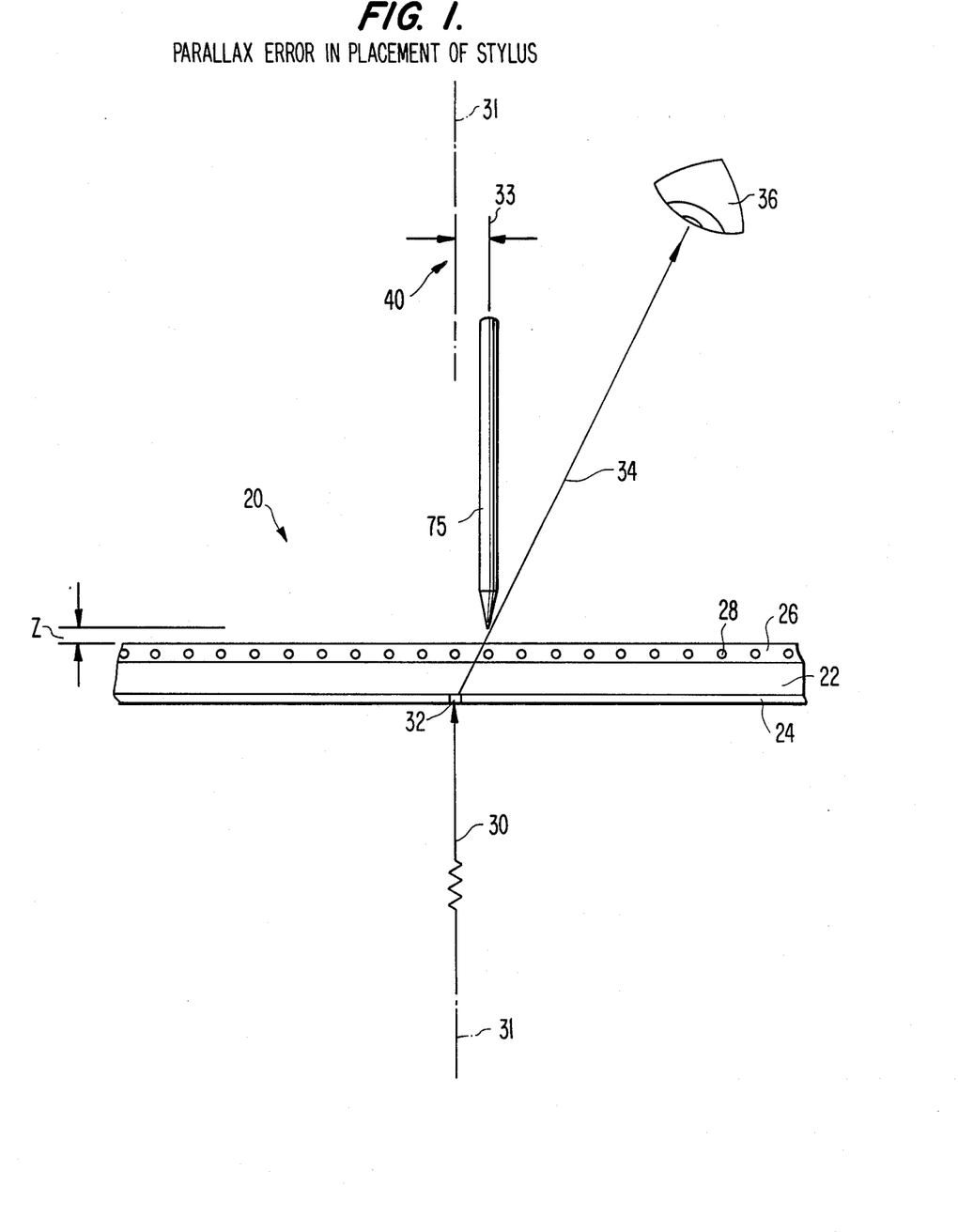
FIG. 1 illustrates the parallax error in the placement of the stylus.

An appreciation for the problem of parallax error in the positioning of a stylus on a graphic input grid overlay can be seen in conjunction with FIG. 1. FIG. 1 shows the viewing surface 20 of a display device such as a cathode ray tube display. The viewing surface 20 consists of a glass plate 22 of finite thickness on whose inside surface is deposited a layer of phosphor 24 which is irradiated by the electron beam 30 along the axis 31. The electron beam 30 strikes the phosphor layer 24 at the point 32, generating a dot image of light which passes through the finite thickness of the glass plate 22 toward the eye 36 of the viewer along the viewing axis 34. The viewing axis 34 is disposed at an acute angle with respect to the electron beam axis 31. The graphic input grid overlay 26 consists of a transparent film within which is embedded an array 28 of horizontal and vertical conductive wires. The conductive wires in the array 28 are sequentially energized with a radiative signal which is picked up by the stylus 75. When the user attempts to position the stylus 75 coincident with the dot image 32 produced by the electron beam 30, the acute angle of the viewing axis 34 with respect to the electron beam axis 31, in conjunction with the finite thickness of the glass plate 22, causes the actual position of the point for the stylus 75 to be displaced at the position 33 shown in FIG. 1, which is at the parallax error distance 40 from the correct position along the electron beam axis 31. It is this parallax error which is desired to be reduced by the operation of the invention disclosed herein.

Figure 2:
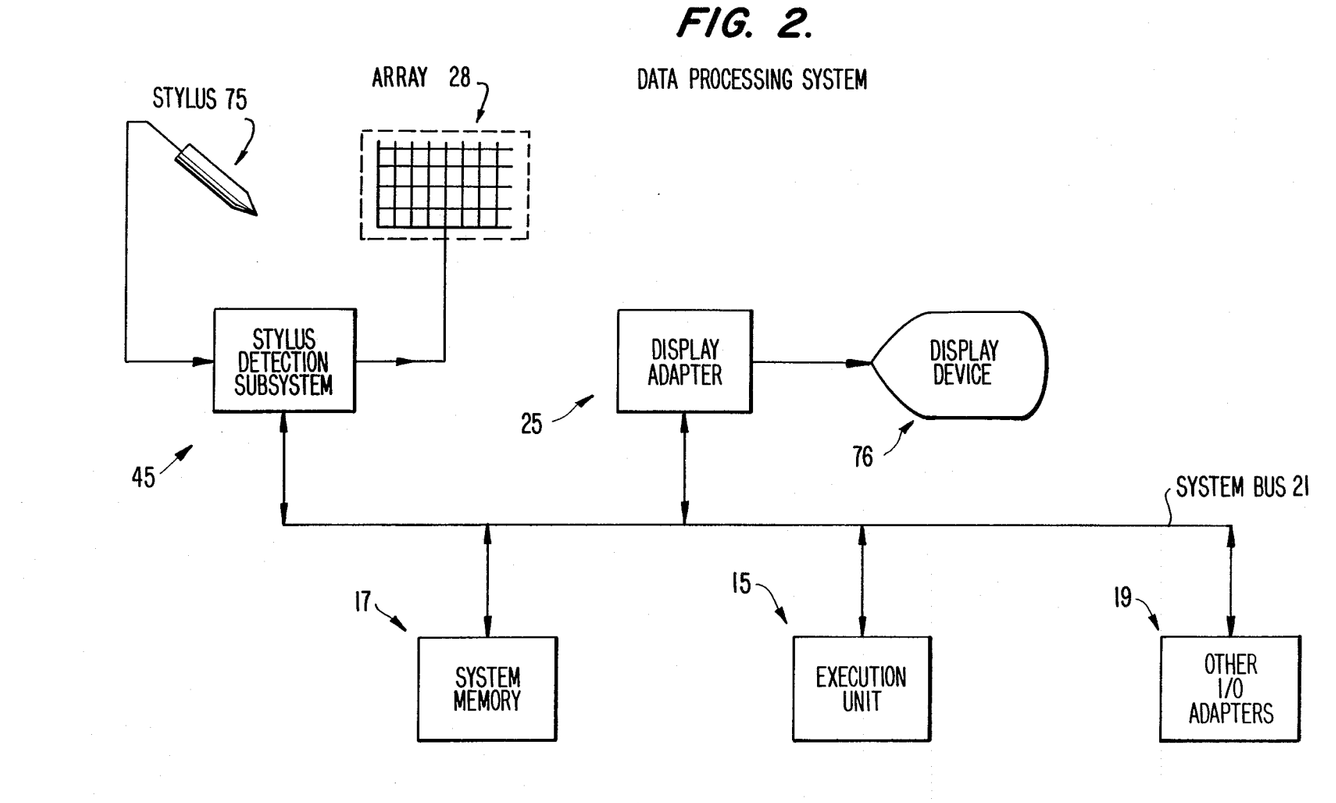
FIG. 2 is a system block diagram of the overall computer architecture within which the invention finds application.

FIG. 2 is an architectural block diagram of the data processing system within which the invention finds application. The invention was designed for use with the IBM Personal Computer, as an I/O adapter referred to herein as the stylus detection subsystem 45. The stylus detection subsystem 45, as an I/O adapter, is designed to be plugged into the I/O bus of the IBM Personal Computer, as is described in *The IBM Personal Computer Technical Reference Manual*, August 1981, published by the International Business Machines Corporation. The I/O bus is a part of the system bus 21 shown in FIG. 2, and includes an address bus, a data bus, and a control bus. Connected to the system bus 21 in FIG. 2 is the execution unit 15 and system memory 17, which consists of read only memory (ROM) elementary routines for performing elementary operations in the various standard I/O devices connected to the system bus 21. The system memory 17 also includes random access memory (ROM) which is writable as well as readable and is employed for the dynamic storage of control parameters, data, and which includes a partition dedicated as the video buffer for the system's display. The display adapter 25 includes a display processor which controls the raster generation and video output to the display device 76. The display device 76 can be a cathode ray tube display, a gas panel display, a light emitting diode array display, or other suitable display device. The display adapter 25 provides an all points addressable mode of display as well as an alphanumeric display mode. Other I/O adapters 19 can be connected to the system bus 21, including the keyboard, disk drives, serial communications ports, printers, and the like. The stylus detection subsystem 45 is shown with the stylus 75 having an output connected thereto and the array 28 of the graphic input grid overlay having an input connected thereto.

Further details of an example architecture for the data processing system shown in FIG. 2 can be found in the copending patent application by B. J. Konopik, et al., entitled "System for Managing a Plurality of Shared Interrupt Handlers in a Linked-List Data Structure," Ser. No. 770,541, filed Aug. 29, 1985, and assigned to the International Business Machines Corporation, incorporated herein by reference.

Figure 3:
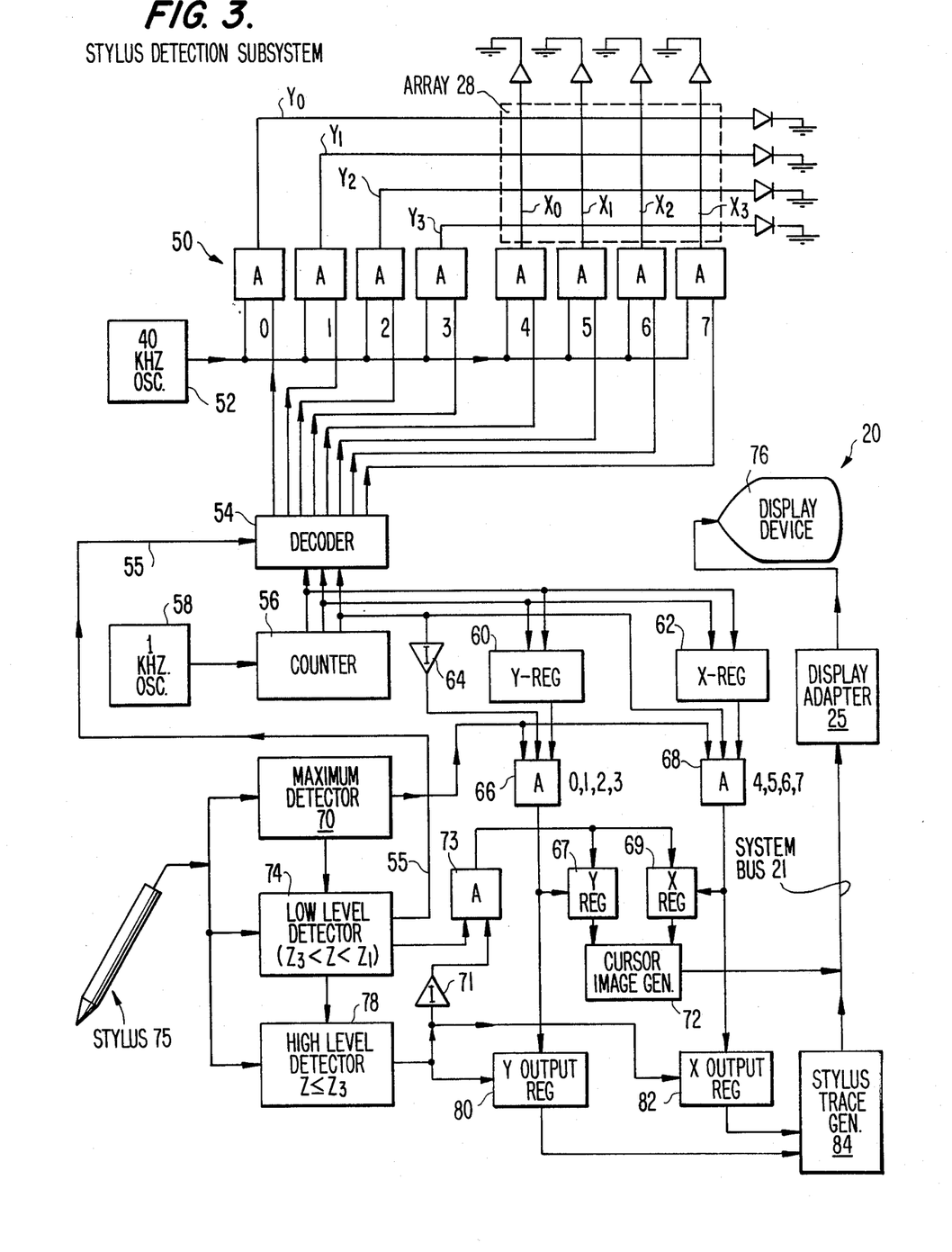
FIG. 3 is a more detailed logic block diagram of the stylus detection subsystem.

The stylus detection subsystem is shown in a logic block diagram in FIG. 3. The array 28 in the graphic input grid overlay is shown with four horizontal wires Y0, Y1, Y2 and Y3 and four vertical wires X0, X1, X2 and X3, which are to be disposed over the viewing surface 20 of the display device. Although only four horizontal wires and four vertical wires are shown for convenience in FIG. 3, any number of such wires can be arranged in the graphic input grid overlay. Each of the wires in the array 28 is connected to the output of a respective two-input AND gate 50, shown in FIG. 3. The first input to the AND gate 50 is connected to the output of a 40 KHz oscillator 52, all of the AND gates 50 having one of their respective inputs connected to the oscillator 52. The other input to each AND gate 50 is respectively connected to one of the enabling outputs from the decoder 54. The 40 KHz oscillator 52 provides the radiative signal which is to be supplied to the wires in the array 28 for radiation from the graphic input grid overlay and for detection by the stylus 75. Although a 40 KHz frequency has been chosen for this application, any suitable frequency can be chosen, keeping in mind the sweep rate desired for sequentially energizing the wires in the array 28 and the potential for interference between the 40 KHz frequency for the oscillator 52 and other oscillatory signals, such as the horizontal oscillator for the raster scan in the display device 76, for example. An enabling signal on any one of the lines output from the decoder 54 which is applied to the second input of a respective one of the AND gates 50, will enable that AND gate 50 to pass the 40 KHz signal output from the oscillator 52 to the respective connected wire in the array 28. The decoder 54 is shown as having a three binary bit input which is converted into one of eight single wire outputs, the respective wire which is enabled corresponding to the numerical value for the three-bit binary value input to the decoder. A second input 55 to the decoder 54 enables a preset pattern of enabling signals to be applied to a preset combination of a subplurality of the wires output from the decoder or alternately all the wires output from the decoder, thereby enabling a plurality of the wires in the array 28 to be simultaneously energized through their respective AND gates, by the 40 KHz oscillator 52.

The counter 56 is shown as a three-bit binary counter which has an input connected to a 1 KHz oscillator 58 which sequentially increments the counter 56 at the 1 KHz rate, in a cyclic count having a binary value of from zero through seven. The 1 KHz frequency for the oscillator 58 was chosen in order to provide a 1 millisecond interval for radiation for each of the wires in the array 28. Any other suitable frequency could be chosen for the oscillator 58. Each binary value of from zero through seven output by the counter 56 is applied to the decoder 54, thereby providing one out of the eight wires output from the decoder 54, with an enabling signal which is applied to its respective AND gate 50. The three-bit binary value output from the counter 56 is also applied to other logic shown in FIG. 3. The two lower order output lines from the counter 58 are applied to the Y register 60 and the X register 62 and the high order binary value output from the counter 56 is applied as one of the inputs to the three-input AND gate 68 and, through the inverter 64 to the three-input AND gate 66. The maximum signal detector 70 has an input connected to
n the stylus 75, for outputting a triggering signal which is input as another one of the inputs to the three-input AND gate 66 and 68. The triggering signal output from the maximum signal detector 70 occurs when a maximum value is detected in the strength of the radiated signal received by the stylus 75 from the respective energized wire in the array 28. Maximum amplitude detectors are well-known in the art and typically operate by electronically taking the time rate of change derivative of the input waveform and determining when the slope of the input waveform is approximately equal to zero, thereby indicating that a maximum amplitude has occurred in the input signal. It is seen that the three-input AND gate 66 is logically satisfied when the binary value of the three-bit output from the counter 56 is equal to 0, 1, 2 or 3 when the maximum signal detector 70 has detected the occurrence of a maximum amplitude signal from the stylus 75. The three-input AND gate 68 is logically satisfied when the binary value output from the three-bit counter 56 is 4, 5, 6 or 7 and the maximum signal detector 70 has detected a maximum in the waveform for the signal received by the stylus 75. When the AND gate 66 is logically satisfied, it outputs a Y coordinate value which is applied to the Y register 67 and to the Y output register 80. When the AND gate 68 is logically satisfied, it outputs an X coordinate value to the X register 69 and to the X output register 82.

The cursor image generator 72 is shown in FIG. 3, having an input connected through the Y register 67 and the AND gate 66 to the counter 56 and the maximum signal detector 70, and it also has an input connected through the X register 69 and the AND gate 68 to the counter 56 and the maximum detector 70. The cursor image generator 72 is shown in FIG. 3, having an output connected to the system bus 21 and in turn to the display adapter 25 and the display device 76. The cursor image generator operates to generate a cursor image for display as the image 90 shown in FIG. 5, on the inside phosphor 24 of the viewing surface 20 for the display, at a location on the viewing surface corresponding to the coordinate values applied by the Y register 67 and the X register 69, which correspond to those wires in the array 28 having maximum signal strength, as detected by the stylus 75. The cursor image generator 72 can be embodied as hardware logic to generate the appropriate cursor image signals, however in the preferred embodiment which is to be employed in an IBM Personal Computer architecture, a cursor drawing subroutine, such as is shown in Table 1, is employed. The cursor drawing subroutine designated as DRAWCRS of Table 1, is a subroutine to draw the moving cursor. The subroutine employs ROM routines stored in the system memory 17, as are described in the IBM technical reference manual cited above. Tables 1, 2 and 3 disclosed herein, are written in assembler language for the IBM Personal Computer. The assembler language is a symbolic language in which every operation code is written in easily remembered symbolic letters called mnemonics. The assembler language of Table 1 resembles machine language in form and content and is made up of statements that represent instructions and comments. The instruction statements are the working part of the language and are divided into machine instructions, assembler instructions, macroinstructions and pseudo operations. The machine instructions are the symbolic representation of the hardware instructions in the assembler's instruction set. The assembler instructions are requests to the assembler program to perform certain operations during the assembly of a source module. The macroinstructions are requests to the assembler program to process a predefined sequence of code. From this sequence, the assembler generates source instructions, which it then processes as if they were part of the original input in the source module. Pseudo operations tell the assembler what to do with data, conditional branches, macros and listings, however they usually do not produce machine language code. A complete explanation of the instructions shown in Tables 1, 2 and 3 can be found in "Macro Assembler by Microsoft," *IBM Personal Computer - Computer Language Series*, 1981, published by the International Business Machines Corporation. The subroutine shown in Table 1 to draw the moving cursor, is divided into two portions, the first portion erases the old horizontal and vertical lines of the existing cursor, and the second portion draws the new horizontal and vertical lines for the new cursor position. When the Y register 67 and the X register 69 are enabled by a signal from the low level detector 74 which passes through the AND gate 73, the Y value and the X value for the coordinates of the detected position for the stylus 75 are passed to the cursor drawing subroutine of Table 1, as represented by the cursor image generator 72 of FIG. 3. The operation of the subroutine of Table 1 then results in the outputting over the system bus 21 to the display adapter 25, of the appropriate signals to control the display of the horizontal and vertical lines of the cursor on the viewing surface 20 of the display device 76.

Figure 4:
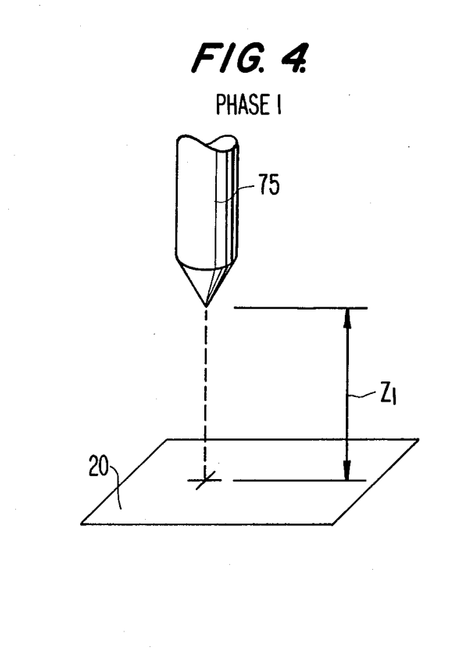
FIG. 4 depicts phase one in the operation of the invention, where the stylus is beyond a first distance Z1 from the viewing surface of the display.

The low level signal detector 74 has an input connected to the stylus 75, a first output 55 connected to the decoder 54 and a second output connected as one input to the two-input AND gate 73. The low level signal detector 74 outputs a first enabling signal over line 55 to the decoder 54 during phase one of the operation of the invention, as is illustrated in FIG. 4. During phase one, the stylus 75 is beyond a distance Z1 from the viewing surface 20 of the display device 76, and thus the detected strength of the signal being radiated from the graphic input grid overlay is not sufficiently large to justify the display of the cursor image 90. As was previously mentioned, the decoder 54, in response to the enabling signal on line 55, connects a plurality of the wires in the array 28 to the oscillator 52, thereby providing a uniform radiated signal from the array 28, in a quiescent state pattern.

Figure 5:
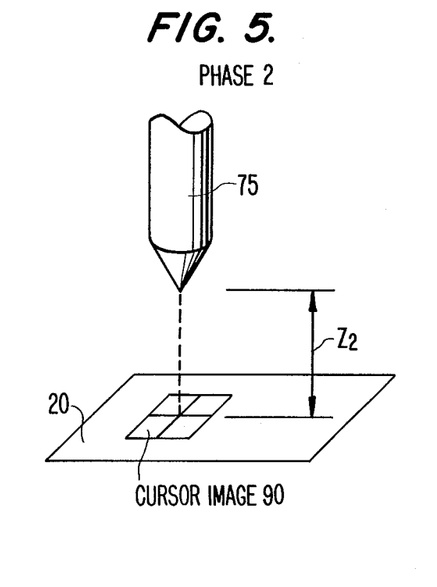
FIG. 5 depicts a second phase in the operation of the invention where the stylus is closer to the viewing surface than Z1 but is still farther from the viewing surface than Z3, during which phase the cursor image will be displayed.

During phase two of the operation of the invention, as is illustrated in FIG. 5, when the stylus 75 is brought closer than the distance Z1 but not as close as the distance Z3, the low level detector 74 will sense the increased strength of the signal radiated from the array 28, and will operate to terminate the first enabling signal on line 55, so that the decoder 54 will now convert the binary value output from the counter 56 to energize only one out of the plurality of outputs from the decoder 54, corresponding tb the binary value input from the counter 56. The low level detector 74 then outputs a second enabling signal to the AND gate 73. If the AND gate 73 is logically satisfied, the enabling signal is output to the Y register 67 and the X register 69, thereby enabling those registers to receive the X and Y values from the respective AND gates 66 and 68, and pass those values on to the cursor image generator 72. The cursor image generator 72, in response, outputs the cursor image signals for display as the cursor image 90 of FIG. 5, on the viewing surface 20 of the display 76 at a location corresponding to the values of the coordinates X and Y representing the detected position of the stylus 75. As long as the high level detector 78 is not outputting an enabling signal, the inverter 71 connected between the output of the high level detector 78 and the second input of the AND gate 73 will serve to logically satisfy the AND gate 73, thereby enabling the generation of the cursor image 90 as shown in FIG. 5.

The stylus trace generator 84 is shown in FIG. 3 as having an input connected to the Y output register 80 and the X output register 82. As previously described, the contents of the Y output register 80 and the X output register 82 are the coordinates of the location of the stylus 75. The Y output register 80 and the X output register 82 are enabled by the high level detector 78. The stylus trace generator 84 has an output connected to the system bus 21 and thus to the display adapter 25, for generating stylus trace signals 95 in FIG. 6, for display on the phosphor layer 24 of the viewing surface 20 for the display device 76, at a location corresponding to the coordinate values stored in the Y output register 80 and the X output register 82. Although the stylus trace generator 84 can be hardware logic which will output suitable stylus trace generation signals to the display adapter 25, since the preferred embodiment disclosed herein is designed for use in the IBM Personal Computer, the preferred embodiment for the stylus trace generator 84 is the stylus trace subroutine shown in Table 3. The subroutine entitled DRAWTRAC is designed to draw a sequence of dots at the locations represented by the X and Y coordinates of the stylus 75. The subroutine of Table 3 uses ROM routines in a manner similar to that described above for the subroutine of Table 1. The subroutine of Table 3 accepts the X and Y coordinates for the location of the stylus 75 when the stylus is closer than the distance Z3 from the viewing surface 20 of the display, and instructs the display adapter 25 to generate a dot image located on the viewing surface 20 at the coordinates X and Y.

Figure 6:
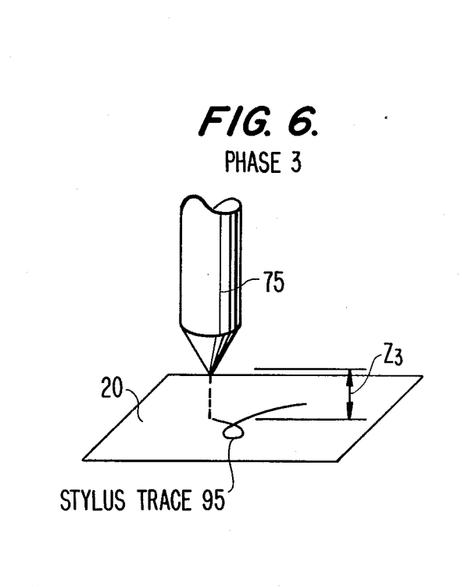
FIG. 6 illustrates phase three in the operation of the invention where the stylus is closer than the distance Z3 from the viewing surface, during which phase the cursor image is no longer displayed and, instead, a trace of the stylus position is displayed.

The high level signal detector 78 has an input connected to the stylus 75 and an output connected to an enabling input for the Y output register 80 and the X output register 82 which are connected to the stylus trace generator 84. The high level signal detector 78 outputs an enabling signal which enables the transfer of the contents of the Y register 80 and the X register 82 to the stylus trace generator 84 when the stylus 75 is closer to the viewing surface 20 than the second distance Z3, as is shown in FIG. 6. The stylus trace generator 84, in response thereto, outputs stylus trace signals for display as the stylus trace 95 on the viewing surface 20 at a location corresponding to the coordinate values for the position of the stylus 75.

In this manner, the user can focus his attention on the displayed location of the cursor on the viewing surface of the display instead of on the physical position of the stylus, in order to identify the location of the stylus as it is perceived by the stylus detection subsystem.

When the stylus 75 is brought from phase two of FIG. 5 to the closer distance of phase 3 in FIG. 6, it is optional that the last cursor image 90 displayed on the viewing surface 20 can be removed prior to the commencement of generating the stylus trace 95 in phase three of FIG. 6. This can be accomplished by providing the cursor image generator 72 with the ability to branch to the cursor erasing subroutine shown in Table 2, which serves to erase the last cursor image 90 which was displayed, prior to the commencement of the stylus trace subroutine of Table 3. Alternately, the stylus trace generator 84 can provide this function by branching to the cursor erasing subroutine of Table 2 prior to the initial running of the stylus trace subroutine of Table 3.

The subroutines of Tables 1, 2 and 3 can be loaded at initial program load time and will reside in the system memory RAM. The subroutines can be invoked either through branching from a control routine or through a hardware initiated interrupt. Interrupt signals and other control information and data can be passed between the stylus detection subsystem 45 and the execution unit 15 by using the principles disclosed in the copending patent application by B. J. Konopik, et al., cited above.

TABLE 1
CURSOR DRAWING SUBROUTINE

```
; DRAWCRS -  Subroutine to draw moving cursor
;            uses ROM routines
      datarea segment            ; define data segment
      x old    dw                ; old x
      y old    dw                ; old y
      x o      dw                ; new x origin
      y o      dw                ; new y origin
      datarea ends
      pro_nam segment            ; define code segment
      main proc far              ; main program
            assume cs            ; pro_nam, ds : datarea
Start 1:
; set up stack for return
            push ds              ; save DS
            sub ax,ax            ; set AX to zero
            push ax              ; put it on stack
; pixel row in DX and column in CX
; erase old horizontal line
            mov dx, y old        ; y origin
            mov cx, x old        ; x origin
            sub cx, 10           ; starting value 10 less
hdot:
            mov al, 0            ; set color to 0
            mov ah, 12d          ; write dot function #
            int 10h              ; call video ROM
            inc cx               ; next dot
            cmp cx, xo           ; done ?
            jl hdot              ; not done
; erase old vertical line
            mov cx, x old        ; x origin
            mov dx, y old        ; y origin
            sub dx, 10           ; starting value 10 less
vdot:
            mov al, 0            ; set color to 0
            mov ah, 12d          ; write dot function #
            int 10h              ; call video ROM
            inc dx               ; next dot
```

TABLE 1-continued
CURSOR DRAWING SUBROUTINE

```
            cmp dx, yo           ; done ?
            jl vdot              ; not done
; draw new horizontal line
            mov dx, yo           ; y origin
            mov cx, xo           ; x origin
            sub cx, 10           ; starting value 10 less
hloc:
            mov al, 1            ; set color to 1
            mov ah, 12d          ; write dot function #
            int 10h              ; call video ROM
            inc cx               ; next dot
            cmp cx, xo           ; done ?
            jl hloc              ; not done
; draw new vertical line
            mov cx, xo           ; x origin
            mov dx, yo           ; y origin
            sub dx, 10           ; starting value 10 less
vloc:
            mov al, 1            ; set color to 1
            mov ah, 12d          ; write dot function #
            int 10h              ; call video ROM
            inc dx               ; next dot
            cmp dx, yo           ; done ?
            jl vloc              ; not done
            mov x old, xo        ; update old x
            mov y old, yo        ; update old y
            ret                  ; return to DOS
      main end p                 ; end of program
      pro_nam ends               ; end of code segment
            end start 1          ; end assembly
```

TABLE 2
CURSOR ERASING SUBROUTINE

```
; ERASCRS -  Subroutine to erase cursor
;            uses ROM routines
      datarea segment            ; define data segment
      x old    dw                ; old x
      y old    dw                ; old y
      datarea ends
      pro_nam segment            ; define code segment
      main proc far              ; main program
            assume cs            ; pro_nam, ds : datarea
Start 2:
; set up stack for return
            push ds              ; save DS
            sub ax,ax            ; set AX to zero
            push ax              ; put it on stack
; pixel row in DX and column in CX
; erase horizontal line
            mov dx, y old        ; y origin
            mov cx, x old        ; x origin
            sub cx, 10           ; starting value 10 less
hdot:
            mov al, 0            ; set color to 0
            mov ah, 12d          ; write dot function #
            int 10h              ; call video ROM
            inc cx               ; next dot
            cmp cx, xo           ; done ?
            jl hdot              ; not done
; erase vertical line
            mov cx, x old        ; x origin
            mov dx, y old        ; y origin
            sub dx, 10           ; starting value 10 less
vdot:
            mov al, 0            ; set color to 0
            mov ah, 12d          ; write dot function #
            int 10h              ; call video ROM
            inc dx               ; next dot
            cmp dx, yo           ; done ?
            jl vdot              ; not done
            ret                  ; return to DOS
      main end p                 ; end of program
      pro_nam ends               ; end of code segment
            end start 2          ; end assembly
```

TABLE 3
STYLUS TRACE SUBROUTINE

```
; DRAWTRAC -  Subroutine to draw trace
;             uses ROM routines
datarea segment       ;  define data segment
x o       dw          ;  x coordinate
y o       dw          ;  y coordinate
datarea ends
pro__nam segment      ;  define code segment
main proc far         ;  main program
          assume cs   :  pro__nam, ds : datarea
Start 3:
; set up stack for return
          push ds     ;  save DS
          sub ax,ax   ;  set AX to zero
          push ax     ;  put it on stack
; pixel row in DX and column in CX
; draw dot
          mov dx, yo  ;  y origin
          mov cx, xo  ;  x origin
          mov al, 1   ;  set color to 1
          mov ah, 12d ;  write dot function #
          int 10h     ;  call video ROM
          ret         ;  return to DOS
main end p            ;  end of program
pro__nam ends         ;  end of code segment
          end start 3 ;  end assembly
```

The invention disclosed above can be used for all of the most common display devices. The operation of the invention enables the operator to focus attention on the displayed location of the cursor instead of on the physical location of the stylus, thereby eliminating the parallax between the perceived position of the stylus by the operator and the detected position of the stylus by the graphic input grid overlay.

Although a specific embodiment of the invention has been disclosed, it will be understood by those of skill in the art that the foregoing and other changes in form and detail may be made therein, without departing from the spirit and the scope of the invention.

What is claimed is:

1. In a data processing system including a display subsystem having a video buffer which stores a data representation of an image to be displayed, an image generator connected to the video buffer to convert the stored representation of the image into video signals and a display device connected to the image generator having a transparent viewing plate of finite thickness with a visual manifestation of the video signals being formed on one side of the plate for viewing through the plate, a stylus detection subsystem used in cooperation with the display subsystem, which minimizes the parallax between the apparent position of a stylus and the detected position thereof, data processing system comprising:

an array of horizontal and vertical signal wires disposed on said viewing plate, for radiating a signal from a radiative signal source for receipt by said stylus;

a decoder connected to said signal wires and said radiative signal source, for connecting selected ones of said signal wires to said signal source;

a counter having an output connected to said decoder, for cyclically outputting coordinate values to said decoder for energizing selected ones of said signal wires with a radiated signal;

a maximum signal detector having an input connected to said stylus, for outputting a triggering signal when a maximum value is detected in the strength of the radiated signal received by said stylus;

a cursor image generator having an input connected to said counter, an input connected to said minimum signal detector and an output connected to said display subsystem, for generating cursor image signals for display on said viewing plate at a location corresponding to coordinate values output from said counter when said signal strength is a maximum;

a low level signal detector, having an input connected to said stylus, a first output connected to said decoder and a second output connected to said cursor image generator, for outputting a first enabling signal to said decoder when said stylus is farther than a first distance from said viewing plate, said decoder in response thereto connecting selected ones of said wires to said signal source to radiate in a quiescent state pattern;

said low level detector terminating said first enabling signal when said stylus is closer to said viewing plate than said first distance but farther than a second distance, and outputting a second enabling signal to said cursor image generator, said cursor image generator in response thereto outputting cursor image signals for display on said viewing plate at a location corresponding to said coordinate values output from said counter;

a stylus trace generator having an imput connected to said counter and said maximum signal detector and an output connected to said display subsystem, for generating stylus trace signals for display on said viewing plate at a location corresponding to said coordinate values output from said counter when said radiated signal strength is a maximum;

a high level signal detector, having an input connected to said stylus and an output connected to said stylus trace generator, for outputting an enabling signal to said stylus trace generator when said stylus is closer to said viewing plate than said second distance, said stylus trace generator in response thereto outputting stylus trace signals for display on said viewing plate at a location corresponding to said coordinate values output from said counter;

whereby the operator can focus attention on the displayed location of said cursor instead of the stylus, to identify the location of the stylus as it is perceived by the stylus detection subsystem.

2. The apparatus of claim 1, wherein said low level detector terminates said second enabling signal when said stylus is closer to said viewing plate than said second distance, said cursor image generator terminating said display of said cursor image in response thereto.

3. In a system including a display subsystem having a display device with a transparent viewing plate of finite thickness, the visual manifestation of the image to be displayed being formed on one side of the plate for viewing through the plate, a stylus detection subsystem used in cooperation with the display subsystem, which minimizes the parallax between the apparent position of a stylus and the detected position thereof, data processing system comprising:

an array of signal wires disposed on said viewing plate, for radiating a signal from a radiative signal source for receipt by said stylus;

a decoding means connected to said signal wires and said radiative signal source, for connecting selected ones of said signal wires to said signal source;

a coordinate means having an output connected to said decoding means, for outputting coordinate values to said decoding means for energizing selected ones of said signal wires with a radiated signal;

a maximum signal detector having an input connected to said stylus, for outputting a triggering signal when a maximum value is detected in the strength of the radiated signal received by said stylus;

a cursor image generator having an input connected to said coordinate means, an input connected to said maximum signal detector and an output connected to said display subsystem, for generating cursor image signals for display on said viewing plate at a location corresponding to said coordinate values output from said coordinate means when said radiated signal strength is a maximum;

a low level signal detector, having an input connected to said stylus, a first output connected to said decoding means and a second output connected to said cursor image generator, for outputting a first enabling signal to said decoding means when said stylus is farther than a first distance from said viewing plate, said decoding means in response thereto connecting selected ones of said wires to said signal source to radiate in a quiescent state pattern;

said low level detector terminating said first enabling signal when said stylus is closer to said viewing plate than said first distance but farther than a second distance, and outputting a second enabling signal to said cursor image generator, said cursor image generator in response thereto outputting cursor image signals for display on said viewing plate at a location corresponding to said coordinate values output from said coordinate means;

a stylus trace generator having an input connected to said coordinate means and said maximum signal detector and an output connected to said display subsystem, for generating stylus trace signals for display on said viewing plate at a location corresponding to said coordinate values output from said coordinate means when said radiated signal strength is a maximum;

a high level signal detector, having an input connected to said stylus and an output connected to said stylus trace generator, for outputting an enabling signal to said stylus trace generator when said stylus is closer to said viewing plate than said second distance, said stylus trace generator in response thereto outputting stylus trace signals for display on said viewing plate at a location corresponding to said coordinate values output from said coordinate means;

whereby the operator can focus attention on the displayed location of said cursor instead of the stylus, to identify the location of the stylus as it is perceived by the stylus detection subsystem.

4. The apparatus of claim 3, wherein said low level detector terminates said second enabling signal when said stylus is closer to said viewing plate than said second distance, said cursor image generator terminating said display of said cursor image in response thereto.

* * * * *